United States Patent [19]
Hein et al.

[11] Patent Number: 5,647,709
[45] Date of Patent: Jul. 15, 1997

[54] ANCHOR BOLT ANCHORABLE BY EXPLOSIVE CHARGE

[75] Inventors: Bernd Hein, Freudenstadt; Wilfried Weber, Schopfloch; Rolf Prümmer, Gundelfingen; Hans Peter Mehlin, Binzen, all of Germany

[73] Assignee: Artur Fischer GmbH & Co. KG, Waldachtal, Germany

[21] Appl. No.: 573,249

[22] Filed: Dec. 15, 1995

[30] Foreign Application Priority Data

Dec. 20, 1994 [DE] Germany ............... 44 45 422.8

[51] Int. Cl.⁶ .................. F16B 19/12; E21D 21/00
[52] U.S. Cl. ............... 411/20; 405/259.1; 405/259.3
[58] Field of Search .............. 405/259.1, 259.3; 411/19, 20, 440, 441

[56] References Cited

U.S. PATENT DOCUMENTS

| | | | |
|---|---|---|---|
| 1,277,370 | 9/1918 | Bovard | 411/20 |
| 2,573,880 | 11/1951 | Temple | |
| 2,618,192 | 11/1952 | Temple | 411/20 |
| 2,883,910 | 4/1959 | Nessler | 411/440 X |
| 3,148,577 | 9/1964 | Parsons | 411/20 |
| 3,196,746 | 7/1965 | Dahl | 411/441 X |
| 4,511,296 | 4/1985 | Stol | 411/440 X |
| 4,813,804 | 3/1989 | Adini | 411/20 X |
| 4,909,686 | 3/1990 | Bender et al. | 411/20 |
| 5,116,175 | 5/1992 | Adini . | |

*Primary Examiner*—Frank Tsay
*Assistant Examiner*—Frederick L. Lagman
*Attorney, Agent, or Firm*—Michael J. Striker

[57] ABSTRACT

An anchor bolt to be anchored by an explosive charge in a blind bore in a solid material, in particular a rock face or concrete, has a deformation chamber containing the explosive charge. To achieve inexpensive manufacture of the anchor bolt, simple mounting and high withdrawal values of the anchor bolt to be anchored, the deformation chamber open towards the leading end of the anchor bolt is closed by a stopper. A striking pin projecting beyond the leading end of the anchor bolt is inserted and guided in the stopper, so that as the rear end of the anchor bolt is hit the striking pin contacts an ignition capsule arranged between the stopper and the explosive charge.

14 Claims, 1 Drawing Sheet

ANCHOR BOLT ANCHORABLE BY EXPLOSIVE CHARGE

BACKGROUND OF THE INVENTION

The present invention relates to an anchor bolt to be anchored by an explosive charge in a blind bore in a solid material, in particular a rock face or concrete, wherein the anchor bolt has a deformation chamber containing the explosive charge.

Anchor bolts of the above mentioned general type are known in the art. One of such anchor bolts is disclosed for example in the German document DE-OS 36 13 624. The anchor bolt disclosed here has a deformation chamber which is completely filled with an explosive capsule. Ignition of the explosive capsule is effected by way of a triggering tool which is applied through an internal bore of the anchor bolt against the end wall of the explosive capsule. Because of this triggering mechanism only sleeve-like anchor bolts can be anchored. Moreover, to build up the pressure of the explosion for the purpose of deforming and forcing the outer surface of the anchor bolt outward, an additional capsule for the explosive charge which absorbs the pressure of the explosion is required. Since the deformation chamber of the anchor bolt is expanded by the outward bulging of the capsule, the size of the deformation chamber determines the amount of explosive and the size of the capsule. This dependency means that a relatively large explosive capsule filled with explosive is required to fill the deformation chamber completely. But the potential danger factors are increased thereby.

An anchor bolt anchorable in a rock face by means of an explosive charge is also known from U.S. Pat. No. 2,573,880. In this solution, a ram located inside the bolt is driven by means of an explosive charge to the leading end of the bolt, whereupon expansion and thus fixing of the bolt is effected. Ignition of the charge is effected by means of an electric ignition device which is in direct contact with the explosive charge. The ignition line is lead outward on the outside of the bolt. The ignition line may therefore suffer damage or even be torn off during placement of the anchor bolt.

SUMMARY OF THE INVENTION

Accordingly, it is an object of the present invention to provide an anchor bolt to be anchored by an explosive charge, which avoids the disadvantages of the prior art.

In keeping with these objects and with others which will become apparent hereinafter, one feature of the present invention resides, briefly stated, in an anchor bolt in which the deformation chamber open toward the leading end of the anchor bolt is closed by a stopper, a striking pin projects beyond the leading end of the anchoring bolt and is inserted and guided in the stopper, and when the rear end of the anchor bolt is hit, the striking pin contacts an ignition capsule arranged between the stopper and the explosive charge.

When the anchor bolt is designed in accordance with the present invention, it is inexpensive to manufacture and is simple and safe to mount, and also has holding values.

The deformation chamber of the anchor bolt serves to receive the explosive charge. By closing the open end of the deformation chamber by means of a stopper, after igniting the explosive charge the pressure of the explosion is able to build up in order to force the chamber outward. This outward bulge presses into the wall of the hole drilled in the anchoring substrate, so that anchoring of the anchor bolt in the anchoring substrate is based on an interlocking engagement.

Ignition of the explosive charge is effected by way of a striking pin which is inserted in a central bore of the stopper so that it projects beyond the leading end of the anchor bolt. The striking pin is advantageously not inserted into the blind bore in the anchoring substrate. Once the striking pin is resting at the bottom of the drilled hole, ignition of the explosive charge is initiated by the striking pin contacting the ignition capsule as a result of a hammer blow on the rear end of the anchor bolt. The pressure of the explosion builds up throughout the deformation chamber and causes the outward bulge for anchoring the anchor bolt. Since the deformation chamber is closed by the stopper and at the same time also serves as the space for receiving the explosive, an additional explosive capsule is not required. Moreover, the deformation chamber can be individually varied to match the particular anchoring substrate or anchor bolt configuration independently of the amount of the explosive.

In a further embodiment of the invention, the striking pin can have an impact stop and be inserted in a central bore of the stopper. It is thus possible for the striking pin to be inserted at the manufacturer's. the impact stop is configured so that it can be overcome only by a powerful hammer blow when mounting the anchor bolt.

For an axial fixing of the stopper in the leading end region of the deformation chamber which will absorb the pressure of the explosion, it is advantageous to provide the stopper with an external thread and to screw it into a corresponding internal thread of the deformation chamber.

Mounting of the ignition capsule in the anchor bolt is made easier by inserting the ignition capsule in the underside of a disc which has an opening and is arranged between the stopper and the explosive charge in the deformation chamber.

For the explosive charge it has proved advantageous to use an explosive having a detonation speed of more than 3500 m/sec. A mixture of the explosives PETN and RDX is especially suitable, wherein it is desirable for the proportion of PETN to be more than 10%.

In a further construction of the invention, a cup-shaped cap covering the projecting end of the striking pin can be placed on the leading end of the anchor bolt. This cap also provides a safeguard against unwanted triggering of the ignition. Prior to introduction in the drilled hole, the cap is removed. The cap may, however, alternatively be equipped with a crumple zone so that its removal is not necessary. By resting on the bottom of the drilled hole, as the anchor bolt is struck the cap is crushed and the striking pin axially displaced to ignite the ignition capsule.

For smaller bolt diameters, it is expedient to construct the deformation chamber as a central bore, the diameter of which is selected such that the thickness of the wall bounding the deformation chamber is about 10–20% of the external diameter of the anchor bolt. The central bore can be divided into two or more sections, the diameter of which becomes smaller towards the rear end of the anchor bolt. In this manner, an increasing outward bulging of the anchor bolt is effected in the direction towards the bottom of the drilled hole.

In the case of anchor bolts of relatively large diameter, it is advantageous to construct the deformation chamber as an annular bore arranged concentrically around the center line. The volume of the deformation chamber and also the amount of explosive for forcing the wall outward can therefore be limited.

To ventilate the deformation chamber after the explosion and for gradual relief of the pressure of the explosion, the anchor bolt can have a ventilation opening starting from the deformation chamber and taken to the outside.

Finally, it is advantageous for the outer surface of the anchor bolt to be roughened, ribbed or the like in the area around the deformation chamber in order to improve the holding values.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
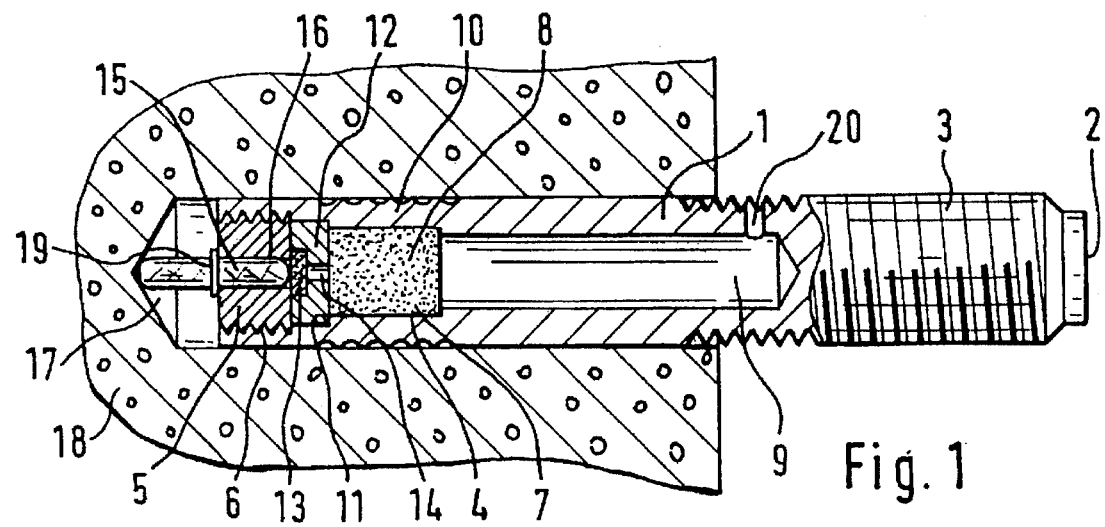
FIG. 1 is a view showing a longitudinal section of an anchor bolt in accordance with the present invention, inserted in an anchoring substrate.

At its rear end 2, the anchor bolt 1 illustrated in FIG. 1 has an external thread 3 for fixing an article. The leading region of the anchor bolt is provided with a deformation chamber 4 which is in the form of a central bore and is divided into several sections. The deformation chamber 4, which is open at the front, is closed by a stopper 5. To hold the stopper 5 and fix it axially the stopper is mounted in the leading end region of the deformation chamber 4 by means of a thread 6. Adjoining the threaded section is a first section 7 of the deformation chamber 4 of reduced diameter compared with the threaded section. The explosive charge 8 is located in this section 7 and is pressed into a cylindrical shape to fit into this section. Adjoining this section 7 there is a section 9 of yet further reduced diameter, the volume of which serves to lessen the pressure of the explosion. The pressure of the explosion, which leads to deformation and outward bulging of the wall 10 bounding the sections builds up in the two sections 7 and 9.

Between the stopper 5 and the shoulder 11 formed by the section 7 there is clamped a disc 12, preferably consisting of metal, in the underside of which the ignition capsule 13 is embedded. Between the ignition capsule 13 and the explosive charge 8 there is a connection by way of the opening 14 so that the explosive charge is initiated by way of the ignition jet released by the ignition capsule.

Ignition of the ignition capsule 13 is caused by the effect of impact, which is applied by the striking pin 15. The striking pin 15 is inserted in a central bore 16 of the stopper 5 so it projects with part of its length beyond the leading end of the anchor bolt 1. The anchor bolt 1 is inserted into the blind bore 17 in the anchoring substrate 18 until the striking pin 15 rests at the bottom of the drilled hole. To anchor the anchor bolt 1, the anchor bolt 1 is driven into the drilled hole 17 by striking its end face 2 with a hammer, so that the striking pin 15 bearing against the bottom of the drilled hole contacts the ignition capsule 13 and thus triggers the ignition of the explosive charge 8. To prevent unintentional triggering of the ignition, an impact stop 19 which can be overcome by a blow is arranged on the striking pin 15. To ventilate the deformation chamber 4 after the anchoring, a laterally located ventilation opening 20 is provided, which is lead outside the drilled hole 17 to the outside.

Figure 2:
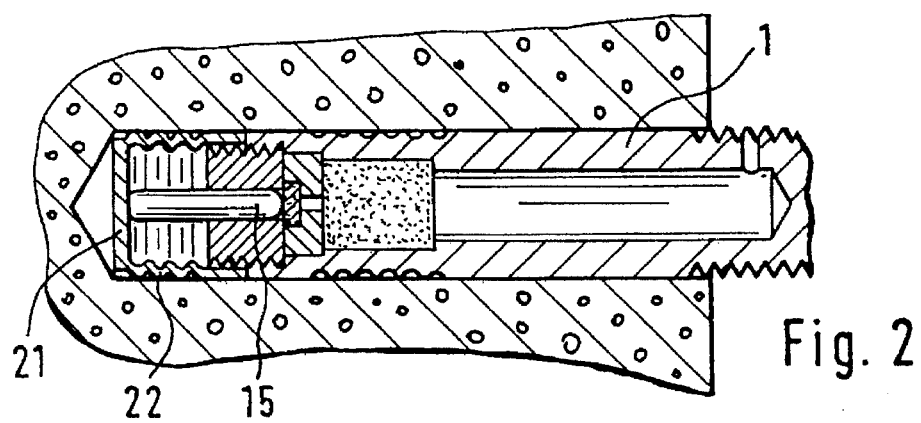
FIG. 2 is a view showing the anchor bolt in accordances with FIG. 1, with a cap for safeguarding the striking pin.

In the embodiment shown in FIG. 2, the projecting end of the striking pin 15 is covered by a cup-shaped cap 21 to safeguard against unintentional triggering of the ignition. The cap 21 is put onto the end of the anchor bolt 1 and can be held by clamping means, snap-in projections or similar means. In the embodiment illustrated, the cap is provided with a crumple zone 22 which, by crumpling as the anchor bolt 1 is hammered against the anchoring substrate, allows the axial displacement of the striking pin 15 and triggering of the ignition. In that case, an impact stop for the striking pin 15 is unnecessary.

Figure 3:
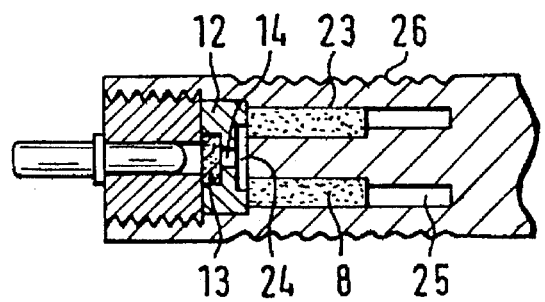
FIG. 3 is a view showing a further embodiment of the anchor bolt of the present invention.

In the embodiment shown in FIG. 3, the deformation chamber of the anchor bolt 1 is in the form of an annular bore 23 arranged concentrically around the center line. To produce a connection between the ignition capsule 13 and the explosive charge 8, in the top side of the disc 12 there is a recess 24 which produces the connection between the central bore 14 and the explosive charge 8. In this embodiment also, the annular bore 23 can be extended by a narrower section 25. To increase the holding value the outer surface of the anchor bolt 1 can be ribbed as at 26 in the area around the deformation chamber.

It will be understood that each of the elements described above, or two or more together, may also find a useful application in other types of constructions differing from the types described above.

While the invention has been illustrated and described as embodied in an anchor bolt anchorable by an explosive charge, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An anchor bolt to be explosively anchored in a blind bore in a solid material, comprising an anchor bolt body having a leading end and a rear end and a deformation chamber which is open toward said leading end of said anchor bolt body; an explosive charge contained in said deformation chamber; a stopper closing said leading end of said anchor bolt; a striking pin inserted and guided in said stopper and projecting beyond said leading end of said anchor bolt body; and an ignition capsule arranged between said stopper and said explosive charge so that when said rear end of said anchor bolt body is hit, said striking pin contacts said ignition capsule.

2. An anchor bolt as defined in claim 1, wherein said stopper has a central bore, said striking pin having an impact stop and being inserted in said central bore of said stopper.

3. An anchor bolt as defined in claim 1; and further comprising means for fixing said stopper in a leading end region of said deformation chamber, said fixing means including a thread provided on said stopper and in said anchor bolt body.

4. An anchor bolt as defined in claim 1; and further comprising a disc arranged between said stopper and said explosive charge and having an opening, said ignition capsule being inserted in an underside of said disc.

5. An anchor bolt as defined in claim 1, wherein said explosive charge is composed of an explosive having a detonation speed of more than 3,500 m/sec.

6. An anchor bolt as defined in claim 1, wherein said explosive charge is composed of a mixture of explosive PETN and RDX with the proportion of the explosive PETN being at least 10%.

7. An anchor bolt as defined in claim 1, wherein said striking pin has an end projecting beyond said leading end of said anchor bolt body; and further comprising a cup-shaped cap placed on said leading end of said anchor bolt body and covering said projecting end of said striking pin.

8. An anchor bolt as defined in claim 7, wherein said cap has a crumple zone.

9. An anchor bolt as defined in claim 1, wherein said deformation chamber is formed as a central bore in said anchor bolt body.

10. An anchor bolt as defined in claim 9, wherein said central bore has a first section having a diameter, and at least one further section adjoining said first section and having a smaller diameter than the diameter of said first section.

11. An anchor bolt as defined in claim 1, wherein said anchor bolt body has a center line, said deformation body being formed as an annular bore arranged concentrically around said center line.

12. An anchor bolt as defined in claim 1, wherein said anchor bolt body has a ventilation opening starting from said deformation chamber and leading to an outside of said anchor bolt body.

13. An anchor bolt as defined in claim 1, wherein said outer surface of said anchor bolt is roughened in an area around said deformation chamber.

14. An anchor bolt as defined in claim 1, wherein said anchor bolt has an outer surface which is ribbed in an area around said deformation chamber.

* * * * *